(12) United States Patent
Zhang

(10) Patent No.: US 8,962,711 B2
(45) Date of Patent: Feb. 24, 2015

(54) COPPER-FREE FRICTION MATERIAL COMPOSITION FOR BRAKE PADS

(75) Inventor: Jim Zewei Zhang, Xianto (CN)

(73) Assignee: Ruiyang Automotive Materials (Xiantao) Co., Ltd., Xiantao, Hubei (CN)

( * ) Notice: Subject to any disclaimer, the term of this patent is extended or adjusted under 35 U.S.C. 154(b) by 0 days.

(21) Appl. No.: 14/118,875

(22) PCT Filed: Jun. 22, 2011

(86) PCT No.: PCT/CN2011/076138
§ 371 (c)(1),
(2), (4) Date: Feb. 26, 2014

(87) PCT Pub. No.: WO2012/159286
PCT Pub. Date: Nov. 29, 2012

(65) Prior Publication Data
US 2014/0357758 A1    Dec. 4, 2014

(30) Foreign Application Priority Data

May 21, 2011    (CN) .......................... 2011 1 0132151

(51) Int. Cl.
| | | |
|---|---|---|
| *C08J 5/14* | (2006.01) | |
| *C08G 73/10* | (2006.01) | |
| *C04B 26/12* | (2006.01) | |
| *C08K 3/00* | (2006.01) | |
| *A01H 5/00* | (2006.01) | |
| *A63B 37/00* | (2006.01) | |
| *C04B 26/06* | (2006.01) | |
| *C08G 65/48* | (2006.01) | |
| *F16D 69/02* | (2006.01) | |

(52) U.S. Cl.
CPC ........ *F16D 69/02* (2013.01); *F16D 2200/0065* (2013.01); *F16D 2200/0034* (2013.01)

USPC .......... 523/156; 523/149; 523/150; 523/153; 524/433; 524/408; 524/409; 524/424; 524/428; 524/437; 524/540

(58) Field of Classification Search
USPC .......... 523/156, 149, 150, 153; 524/433, 408, 524/409, 424, 428, 437, 540
See application file for complete search history.

(56) References Cited

U.S. PATENT DOCUMENTS

| 485,691 | A | * | 11/1892 | Nishimura et al. | ............. | 29/523 |
| 3,959,194 | A | * | 5/1976 | Adelmann | ................ | 523/158 |
| 5,385,989 | A | * | 1/1995 | Ohya | ...................... | 525/502 |
| 5,433,774 | A | * | 7/1995 | Kapl et al. | .................... | 106/36 |
| 2003/0167969 | A1 | * | 9/2003 | Huener et al. | ................ | 106/36 |
| 2010/0196691 | A1 | * | 8/2010 | Unno et al. | ................... | 428/221 |
| 2010/0233464 | A1 | * | 9/2010 | Unno | ............................ | 428/323 |

* cited by examiner

*Primary Examiner* — Alexander Kollias
(74) *Attorney, Agent, or Firm* — Kory D. Christensen; Stoel Rives LLP

(57) ABSTRACT

A copper-flee friction material composition for brake pads consists of: 0.43 parts of aramid fiber, 1.9 parts of tire powder, 6 parts of heavy magnesia, 2.55 parts of calcined petroleum coke, 8 parts of ceramic fiber, 6.5 parts of phenolic resin, 14 parts of aluminum silicate fiber, 22 parts of potassium hexatitanate crystal whisker, 25 parts of barite powder, 5 parts of granular graphite, 2 parts of antimony sulfide, 2.8 parts of friction powder of cashew nut oil, 0.9 part of boron nitride, 5 parts of flake aluminum powder, and 0.6 parts of tantalum carbide. Trials show that it has satisfactory high temperature and thermal decay resistant performance, long service life, good abrasion resistance and stable friction coefficient. With the friction material of the present invention used, the brake pad of vehicles is sensitive and stable during braking, produces no screech, is comfortable and has no damage on coupling plate.

3 Claims, No Drawings

COPPER-FREE FRICTION MATERIAL COMPOSITION FOR BRAKE PADS

FIELD OF THE INVENTION

The present invention relates to a friction material composition for brake pad of vehicles, particularly to a copper-free friction material composition for brake pad.

BACKGROUND OF THE INVENTION

Nowadays, the friction material used in vehicles contains a great of heavy metal comprising copper, chromium, cadmium, lead, and the like. A small amount of heavy metal dust may be released from vehicles during every time of braking, which can be accumulated to be harmful in the environment. For example, the compound of cadmium can be absorbed in vivo through breathing and be accumulated in liver or kidney, hereby do harm to kidney and liver. Copper-containing dusts may become biological toxicants for fishes such as salmons after entering into the environment. It is shown that 30% percent of the copper pollution in the environment is caused by brake pad of vehicles. Therefore, the influence of the brake pad of vehicles on the environment must be focused on. Currently, the whole world is making research in how to prevent such phenomenon proceeding. For example, No. SB6577 Bill was signed by the governor of Washington state of US, Chris Gregoire and was allowed in the 61$^{st}$ legislative session. The Bill intends to gradually forbid the use of copper in brake pad of vehicles, and will severely punish transgressors, which cites: since Jan. 1, 2014, the friction material for flake pad of vehicles sold in or to Washington by manufacturers, retailers and dealers shall contain the following substances without exceeding the limited amount based on the total weight: 1. asbestos fibers, no more than 1%; 2. cadmium and the compounds thereof, no more than 0.01%; 3. chromium salts, no more than 0.1%; 4. lead and the compounds thereof, no more than 0.1%; 5. mercury and the compounds thereof, no more than 0.1%. Since Jan. 1, 2021, the friction material for flake pad of vehicles sold in or to Washington by manufacturers, retailers and dealers shall contain no more than 5% of the total weight of copper. Meanwhile, an advisory committee of experts in industry, safety and environment was established to research and assess the feasibility of limiting the amount of copper within 0.5% in the future.

Coincidentally, also in 2010, Schwarzenegger, the governor of California state signed and allowed No. SB346 Bill to require all the manufacturers of brake pad of vehicles to reduce the amount of copper in the friction material of brake pad sold in California state, to no more than 5% till 2021, and to no more than 0.5% till 2025.

The above two American bills indicate the requirement of human for environment protection more severe and careful. Therefore, the manufacturers of parts for vehicles have to draw attention to this, and under the provision that the characteristic of brake pad is assured, it is necessary to find safer, more effective and environmentally friendly friction material to replace heavy metals such as copper so as to meet with the gradually severe requirement for environment protection.

Content of the Invention

The present invention provides a copper-free friction material composition to solve the technical problems, such as excessive amount of heavy metals such as copper and cadmium, high braking noise, severe harm to the environment, and the like.

In order to overcome the above problems, the technical solution adopted in the present invention is as following: a copper-free friction material composition used for brake pad, consisting of the following components by weight parts: 0.4~0.6 parts of aramid fiber, 1.8~2.2 parts of tyre powder, 5.5~7 parts of heavy magnesia, 2.5~3 parts of calcined petroleum coke, 7~10 parts of ceramic fiber, 5~7 parts of phenolic resin, 10~20 parts of aluminium silicate fiber, 18~25 parts of potassium hexatitanate crystal whisker, 20~30 parts of barite, 4.5~6 parts of granular graphite, 1.8~2.5 parts of antimony sulfide, 2.5~3 parts of friction powder of cashew nut oil, 0.8~1.2 parts of boron nitride, 3~5 parts of flake aluminum powder, and 0.4~0.6 parts of tantalum carbide.

Preferably, the friction material composition consists of the following components by weight parts: 0.5 parts of aramid fiber, 2.2 parts of tyre powder, 7 parts of heavy magnesia, 3 parts of calcined petroleum coke, 10 parts of ceramic fiber, 7 parts of phenolic resin, 20 parts of aluminium silicate fiber, 25 parts of potassium hexatitanate crystal whisker, 30 parts of barite powder, 6 parts of granular graphite, 2.5 parts of antimony sulfide, 3 parts of friction powder of cashew nut oil, 1 part of boron nitride, 4 parts of flake aluminum powder, and 0.5 parts of tantalum carbide.

Preferably, the friction material composition consists of the following components by weight parts: 0.43 parts of aramid fiber, 1.9 parts of tyre powder, 6 parts of heavy magnesia, 2.55 parts of calcined petroleum coke, 8 parts of ceramic fiber, 6.5 parts of phenolic resin, 14 parts of aluminium silicate fiber, 22 parts of potassium hexatitanate crystal whisker, 25 parts of barite powder, 5 parts of granular graphite, 2 parts of antimony sulfide, 2.8 parts of friction powder of cashew nut oil, 0.9 part of boron nitride, 5 parts of flake aluminum powder, and 0.6 parts of tantalum carbide.

The process of using the friction material composition to produce brake pad is as following:

feeding the following components by weight parts into a high-speed dispersion machine: 0.4~0.6 parts of aramid fiber, 1.8~2.2 parts of tyre powder, 5.5~7 parts of heavy magnesia, 2.5~3 parts of calcined petroleum coke, 7~10 parts of ceramic fiber, 5~7 parts of phenolic resin, 10~20 parts of aluminium silicate fiber, 18~25 parts of potassium hexatitanate crystal whisker, 20~30 parts of barite, 4.5~6 parts of granular graphite, 1.8~2.5 parts of antimony sulfide, 2.5~3 parts of friction powder of cashew nut oil, 0.8~1.2 parts of boron nitride, 3~5 parts of flake aluminum powder, and 0.4~0.6 parts of tantalum carbide;

stirring the components into a homogeneously dispersed friction material composition in a form of powder;

taking out the friction material composition and putting it into a shaping mould to be shaped by pressing;

combining the friction material composition with a steel back, and putting the steel back into a plate vulcanizing machine, left for 15 minutes under a high temperature of 270° C., and a pressure of 18 MPa; and taking out the brake pad, and removing burrs to form a final product.

The present invention assures the advantage of every component can be sufficiently developed in the friction material through reasonably combining various components. For example, the combination of several new fiber materials can not only compensate the shortcomings of them, but produce excellent performance due to their synergistic effects. As the friction material used in the present invention is environmentally safe, and the amount of heavy metals in the present invention is extremely low, the friction material composition of the present invention is highly environmental friendly. At the same time, during using, the friction material composition can form excellent friction layer and transform membrane. It is shown in trials that the friction material composition of the present invention has a satisfactory high temperature and thermal decay resistant performance, long service life, good abrasion resistance and stable friction coefficient. With the friction material composition of the present invention used, the brake pad of vehicles is sensitive, stable during braking, free of sharp noise during braking, comfortable and not damageable to the coupling plate.

DETAILED DESCRIPTION OF THE INVENTION

The technical solutions of the present invention will be illustrated in more details through the following examples.

Example 1

The following components were poured into a high-speed dispersion machine by weight parts: 0.4 parts of aramid fiber, 1.8 parts of tyre powder, 5.5 parts of heavy magnesia, 2.5 parts of calcined petroleum coke, 7 parts of ceramic fiber, 5 parts of phenolic resin, 10 parts of aluminium silicate fiber, 18 parts of potassium hexatitanate crystal whisker, 20 parts of barite powder, 4.5 parts of granular graphite, 1.8 parts of antimony sulfide, 2.5 parts of friction powder of cashew nut oil, 0.8 parts of boron nitride, 5 parts of flake aluminum powder, and 0.4 parts of tantalum carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 2

The following components were poured into a high-speed dispersion machine by weight parts: 0.5 parts of aramid fiber, 2.2 parts of tyre powder, 1 parts of heavy magnesia, 3 parts of calcined petroleum coke, 10 parts of ceramic fiber, 7 parts of phenolic resin, 20 parts of aluminium silicate fiber, 25 parts of potassium hexatitanate crystal whisker, 30 parts of barite powder, 6 parts of granular graphite, 2.5 parts of antimony sulfide, 3 parts of friction powder of cashew nut oil, 1 part of boron nitride, 4 parts of flake aluminum powder, and 0.5 parts of tantalum carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 3

The following components were poured into a high-speed dispersion machine by weight parts: 0.43 parts of aramid fiber, 1.9 parts of tyre powder, 6 parts of heavy magnesia, 2.55 parts of calcined petroleum coke, 8 parts of ceramic fiber, 6.5 parts of phenolic resin, 14 parts of aluminium silicate fiber, 22 parts of potassium hexatitanate crystal whisker, 25 parts of barite powder, 5 parts of granular graphite, 2 parts of antimony sulfide, 2.8 parts of friction powder of cashew nut oil, 0.9 parts of boron nitride, 5 parts of flake aluminum powder, and 0.6 parts of tantalum carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 4

The following components were poured into a high-speed dispersion machine by weight parts: 0.48 parts of aramid fiber, 2 parts of tyre powder, 6.5 parts of heavy magnesia, 2.57 parts of calcined petroleum coke, 9 parts of ceramic fiber, 6 parts of phenolic resin, 15 parts of aluminium silicate fiber, 20 parts of potassium hexatitanate crystal whisker, 27 parts of barite powder, 5.5 parts of granular graphite, 2.3 parts of antimony sulfide, 2.7 parts of friction powder of cashew nut oil, 1.2 parts of boron nitride, 3 parts of flake aluminum powder, and 0.4 parts of tantalum carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 5

The following components were poured into a high-speed dispersion machine by weight parts: 0.43 parts of aramid fiber, 2.17 parts of tyre powder, 6.6 parts of heavy magnesia, 2.8 parts of calcined petroleum coke, 8.8 parts of ceramic fiber, 6.3 parts of phenolic resin, 15.5 parts of aluminium silicate fiber, 21.8 parts of potassium hexatitanate crystal whisker, 22.5 parts of barite powder, 5.06 parts of granular graphite, 2.2 parts of antimony sulfide, 2.9 parts of friction powder of cashew nut oil, 1.1 parts of boron nitride, 3.5 parts of flake aluminum powder, and 0.46 parts of tantalum carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

The components employed in the examples are described as following:

The aramid fiber has good properties such as high strength, high modulus, high-temperature resistance, acid and base resistance, light weight, and the like. Particularly, its strength is 5-6 times higher than that of a steel wire, its modulus is 2-3 times higher than that of a steel wire or a glass fiber, its tenacity is 2 times higher than that of a steel wire, its weight is only one fifth of that of a steel wire, and it won't decompose or melt at 560° C. The brake pad prepared from aramid fiber has characteristics such as excellent heat resistance, cutting and bending strength, and good braking effect.

The tyre powder (60-80 meshes) is used as elastic filler in the friction material, and plays a role in enhancing friction and reducing noise. The barite can stabilize the friction strength and durability of the friction material. The use of the granular graphite in the friction material can reduce thermal decay of the friction material, and stabilize the friction coefficient thereof.

The calcined petroleum coke (20~30 meshes) is granule prepared from high-temperature calcination of excellent petroleum with low rigidity and high porosity, and can be used in all kinds of friction materials. Addition of the mixture of calcined coke and graphite in a certain ratio into the friction material can make the friction material have perfect overall performance, and facilitates to prevent metal adhesion, thus enhancing friction property and reducing thermal decay of the friction material.

The ceramic fiber employs facial mineral fiber prepared by short-cutting excellent aluminium silicate fiber, which has advantages such as light weight, environmental friendly, high-temperature resistance, good heat stability, low heat conductance, low specific heat, mechanical vibration resistance, high tearing and bending strength, and the like, and can greatly enhance the stability of the friction material during manufacture and use. The ceramic fiber employed in the examples may adopt the high aluminium typed (alumina≥65%) ceramic fiber provided by Fengrun Special Fiber Limited Corporation (Changzhou City in Jiangsu Province in China).

The aluminum silicate fiber can effectively absorb the noise caused by the friction material due to braking, and have good high-temperature resistance, and it can also reduce thermal decay and expansion performance of other low-temperature materials in the friction material when adhering to the surface of the friction material, thus enhancing the stability of the friction material during manufacture and use. The aluminium silicate fiber used in the examples may employ the aluminium silicate fiber provided by Fengrun Special Fiber Limited Corporation (Changzhou City in Jiangsu Province in China).

The composition of the potassium titanate crystal whiskers usually is represented by $K_2O.nTiO_2$, n=1, 2, 4, 6, 8. There are significant difference in the structure and property in the potassium titanate crystal whiskers, in which the value of potassium hexatitanate crystal whisker is the biggest. The potassium hexatitanate crystal whisker used in the examples reflects the energy in the course of friction and slowly transfers the energy, which leads to slow elevation of the temperature of brake pad, maintains stability of the friction coefficient, reduces abrasion, thus prolongs service life of brake pad. During braking of vehicles, especially in the course of long time of braking, the brake pad made of the potassium hexatitanate crystal whisker can assure the friction coefficient of the brake pad without considerable change, do not cause invalidation or "locking" of the brake pad due to elevation of the temperature of the brake pad. The potassium hexatitanate crystal whisker used in the examples may employ the potassium hexatitanate crystal whisker provided by Shanghai Crystal Whisker Composite Material Manufacture Limited Corporation (in China).

The barite may employ 500-600 meshes of barite powder.

The granular graphite has complete crystal structure and high porosity, and stable heat conduction performance, can reduce abrasion and friction noise, and has good adhesion to other friction materials. The granular graphite used in the examples may employ 20~40 meshes of the granular graphite with 98% of carbon content and 18% of porosity.

Antimony sulphide has lower melting point, will produce antimony oxide after decomposition at high temperature, and produce metal antimony at the presence of reducing agents, can prevent oxidative combustion of materials at high temperature, maintain friction stability of the friction material, enhance combustion resistance of the friction material, and can lower the decomposition rate at high temperature of organic adhesives, prolong service life of the material, and function as high-temperature inorganic adhesives and lubrication friction adjusting agents.

The friction powder of cashew nut oil, i.e. the friction powder of cashew nut shell oil, is prepared from cashew nut shell oil, which can improve interface adhesion between organic fibers and granules, while allowing to control abrasion, provide protection and prevent temperature further elevating. When operated at a high temperature of above 300° C., the brake pad has stable friction coefficient, extremely low thermal expansion, and do not produce "locking" phenomenon during braking.

Boron nitride of hexagonal phase (250-300 meshes) has characteristics such as good lubricity, low thermal expansion coefficient, high chemical stability, and the like. Particularly, its thermal conductivity is comparative to that of steel.

The flake aluminum powder (40-80 meshes) is soft and light, and function to stabilize the friction coefficient and to reduce abrasion in the friction material. The melting of the aluminum powder during friction absorbs a great of heat, performs a function of thermal dispersion, and can prolong the service life of the brake system without damaging the coupling plate. The flake aluminum powder used in the examples may employ the flake aluminum powder provided by Fengrun Special Fiber Limited Corporation (Changzhou City in Jiangsu Province in China).

Tantalum carbide is light brown metal-like cubic crystal powder, is used for a friction material, can reduce diffusion abrasion of brake pad, and further enhance application property of brake pad. The examples employ tantalum carbide of cubic phase.

Comparative Example 1

The Brake Pad of Organic Fiber

The following components were poured into a high-speed dispersion machine by weight parts: 9% of friction powder of cashew nut oil, 5% of tyre powder (60~80 meshes), 4% of chromite powder, 4% of calcined petroleum coke, 3% of flake graphite, 5% of flake aluminum powder, 4% of silicate fiber, 7% of antimony sulfide, 7% of brass fiber, 3% of glue-sprayed aluminium silicate fiber, 9% of vermiculite powder (20~40 meshes), 15% of phenolic resin, 10% of barite powder (600 meshes), 1% of polyacrylonitrile fiber, 3% of wood pulp fiber, 4% of viscose fiber, 4% of bamboo charcoal fiber; and were stirred into powder. The powder was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Comparative Example 2

Brake Pad of Half-Metal

The following components were poured into a high-speed dispersion machine by weight percents: 5% of nitrile butadiene rubber powder, 2% of tyre powder (60-80 meshes), 5% of flake graphite, 8% of foam iron powder, 12% of boron-containing phenolic resin, 10% grinded steel fiber, 3.5% of alumina fiber, 9% of pure copper fiber, 5% of friction powder of cashew nut oil, 2% of graphite granule, 2% of calcined petroleum coke, 9.3% of barite powder (600 meshes), 3% of chromite powder, 2.5% of magnetite powder, 4% of diatomite (500-600 meshes), 9% of glue-sprayed aluminum silicate fiber, 3.4% of flake aluminum powder, 3% of molybdenum disulfide, 0.4% of zinc stearate, 1% of antimonic sulfide, 0.9% of copper sulfide; and were stirred into powder. The powder was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

In order to confirm the effects of the present invention, the brake pads prepared from examples 1-5 and comparative examples 1-2 are tested respectively according to Chinese National Standard GB5763-1998. The results are summarized as following:

| Test | | | Test temperature | | | | | |
|---|---|---|---|---|---|---|---|---|
| No. | item | | 100° C. | 150° C. | 200° C. | 250° C. | 300° C. | 350° C. |
| Example 1 | Friction | warming | 0.37 | 0.38 | 0.39 | 0.40 | 0.39 | 0.38 |
| | coefficient(u) | cooling | 0.38 | 0.38 | 0.40 | 0.39 | 0.40 | |
| | Abrasion rate (V)$10^{-7}$ cm$^3$/N·m | | | 0.15 | 0.15 | 0.20 | 0.25 | 0.30 | 0.37 |
| Example 2 | Friction | warming | 0.38 | 0.39 | 0.40 | 0.40 | 0.39 | 0.38 |
| | coefficient(u) | cooling | 0.39 | 0.40 | 0.40 | 0.38 | 0.40 | |
| | Abrasion rate (V)$10^{-7}$ cm$^3$/N·m | | | 0.15 | 0.20 | 0.25 | 0.30 | 0.36 |
| Example 3 | Friction | warming | 0.37 | 0.38 | 0.39 | 0.40 | 0.40 | 0.39 |
| | coefficient(u) | cooling | 0.39 | 0.40 | 0.40 | 0.39 | 0.40 | |
| | Abrasion rate (V)$10^{-7}$ cm$^3$/N·m | | | 0.15 | 0.20 | 0.25 | 0.30 | 0.35 |
| Example 4 | Friction | warming | 0.37 | 0.38 | 0.38 | 0.40 | 0.39 | 0.37 |
| | coefficient(u) | cooling | 0.38 | 0.39 | 0.40 | 0.39 | 0.40 | |
| | Abrasion rate (V)$10^{-7}$ cm$^3$/N·m | | | 0.15 | 0.20 | 0.25 | 0.30 | 0.37 |
| Example 5 | Friction | warming | 0.37 | 0.36 | 0.35 | 0.34 | 0.34 | 0.34 |
| | coefficient(u) | cooling | 0.38 | 0.38 | 0.37 | 0.36 | 0.35 | |
| | Abrasion rate (V)$10^{-7}$ cm$^3$v/N·m | | 0.15 | 0.23 | 0.25 | 0.30 | 0.35 | 0.39 |
| Comparative | Friction | warming | 0.38 | 0.38 | 0.39 | 0.40 | 0.39 | 0.38 |
| Example 1 | coefficient(u) | cooling | 0.39 | 0.40 | 0.40 | 0.39 | 0.40 | |
| | Abrasion rate (V)$10^{-7}$ cm$^3$/N·m | | 0.15 | 0.15 | 0.20 | 0.25 | 0.30 | 0.37 |
| Comparative | Friction | warming | 0.37 | 0.36 | 0.35 | 0.34 | 0.34 | 0.33 |
| Example 2 | coefficient(u) | cooling | 0.38 | 0.38 | 0.37 | 0.36 | 0.35 | |
| | Abrasion rate (V)$10^{-7}$ cm$^3$/N·m | | | 0.15 | 0.20 | 0.25 | 0.30 | 0.35 |

The results show that: though the present invention does not employ heavy metals such as copper and chromium, the new formulations make the brake pads prepared according to the present invention have comparative abrasion performance and thermal decay resistance at high temperature to those of comparative example 1 or 2, thus possess considerable environmental effects.

In order to further confirm the effects of the present invention, the present inventors installed the brake pads prepared according to the present invention to the Buick car from Shanghai General Motor to perform braking experiments. After three drivers (with more than 15 yeas of driving age) repeatedly braked, they all confirmed the brake pads of the present invention were sensitive, stable during braking, produced no noise, and were comfortable.

What is claimed is:

1. A copper-free friction material composition for a brake pad, the copper-free friction material composition consisting of:
   0.4-0.6 parts by weight of aramid fiber;
   1.8-2.2 parts by weight of tire powder;
   5.5-7 parts by weight of magnesia;
   2.5-3 parts by weight of calcined petroleum coke;
   7-10 parts by weight of ceramic fiber;
   5-7 parts by weight of phenolic resin;
   10-20 parts by weight of aluminum silicate fiber;
   18-25 parts by weight of potassium hexatitanate crystal whisker;
   20-30 parts by weight of barite;
   4.5-6 parts by weight of granular graphite;
   1.8-2.5 parts by weight of antimony sulfide;
   2.5-3 parts by weight of friction powder of cashew nut oil;
   0.8-1.2 parts by weight of boron nitride;
   3-5 parts by weight of flake aluminum powder; and
   0.4-0.6 parts by weight of tantalum carbide.

2. The copper-free friction material composition of claim 1, wherein
   the aramid fiber is 0.5 parts by weight;
   the tire powder is 2.2 parts by weight;
   the magnesia is 7 parts by weight;
   the calcined petroleum coke is 3 parts by weight;
   the ceramic fiber is 10 parts by weight;
   the phenolic resin is 7 parts by weight;
   the aluminum silicate is 20 parts by weight;
   the potassium hexatitanate crystal whisker is 25 parts by weight;
   the barite powder is 30 parts by weight;
   the granular graphite is 6 parts by weight;
   the antimony sulfide is 2.5 parts by weight;

the friction powder of cashew nut oil is 3 parts by weight;
the boron nitride is 1 part by weight;
the aluminum powder is 4 parts by weight; and
the tantalum carbide is 0.5 parts by weight.

3. The copper-free friction material composition of claim 1, wherein
the aramid fiber is 0.43 parts by weight;
the tire powder is 1.9 parts by weight;
the magnesia is 6 parts by weight;
the calcined petroleum coke is 2.55 parts by weight;
the ceramic fiber is 8 parts by weight;
the phenolic resin is 6.5 parts by weight;
the aluminum silicate fiber is 14 parts by weight;
the hexatitanate crystal whisker is 22 parts by weight;
the barite powder is 25 parts by weight;
the granular graphite is 5 parts by weight;
the antimony sulfide is 2 parts by weight;
the friction powder of cashew nut oil is 2.8 parts by weight;
the boron nitride is 0.9 parts by weight;
the aluminum powder is 5 parts by weight; and
the tantalum carbide is 0.6 parts by weight.

* * * * *